United States Patent [19]
Riley et al.

[11] Patent Number: 5,424,023
[45] Date of Patent: Jun. 13, 1995

[54] APPARATUS AND METHOD OF FORMING CURVED EXTRUDED PRODUCTS

[75] Inventors: Bobby D. Riley; William Taylor, both of Columbus, Ohio

[73] Assignee: Crane Plastics Company Limited Partnership, Columbus, Ohio

[21] Appl. No.: 71,629

[22] Filed: Jun. 3, 1993

[51] Int. Cl.⁶ .................. B29C 47/90; B29C 53/02
[52] U.S. Cl. .................... 264/560; 264/562;
264/571; 264/177.17; 264/177.19; 264/285;
264/339; 264/178 R; 425/71; 425/325;
425/326.1; 425/377; 425/388
[58] Field of Search .............. 264/571, 339, 566, 568,
264/177.1, 557, 177.16–177.19, 237, 285, 348,
281, 560, 562, 178 R; 425/325, 326.1, 71, 388,
377, 391, 319

[56] References Cited

U.S. PATENT DOCUMENTS

| | | | |
|---|---|---|---|
| 2,620,513 | 12/1952 | Cryor et al. | 18/9 |
| 2,728,104 | 12/1955 | Fisch | 264/177.17 |
| 2,779,388 | 1/1957 | Quoss | 264/285 |
| 2,987,768 | 6/1961 | Given | 18/14 |
| 3,068,136 | 12/1962 | Reid | 156/200 |
| 3,490,113 | 1/1970 | Bulck et al. | 425/377 |
| 3,538,210 | 11/1970 | Gatto | 264/237 |
| 3,748,077 | 7/1973 | Williams et al. | 425/317 |
| 3,804,574 | 4/1974 | Gatto | 425/325 |
| 3,868,789 | 3/1975 | Gates | 49/501 |
| 4,029,452 | 6/1977 | Schippers et al. | 425/325 |
| 4,081,504 | 3/1978 | Wenrick et al. | 264/174 |
| 4,087,509 | 5/1978 | Gates | 264/295 |
| 4,271,107 | 6/1981 | Phipps | 264/562 |
| 4,273,523 | 6/1981 | Levens | 425/326 |
| 4,290,989 | 9/1981 | Topor et al. | 264/142 |
| 4,452,752 | 6/1984 | Harder et al. | 425/325 |
| 4,676,856 | 6/1987 | Shigeki et al. | 156/201 |
| 4,749,535 | 6/1988 | Matsuda | 264/151 |
| 4,906,171 | 3/1990 | Miller | 425/131.1 |
| 4,929,167 | 5/1990 | Pepper | 425/325 |
| 4,967,473 | 11/1990 | Wessel | 29/897.2 |
| 5,061,335 | 10/1991 | Tamura et al. | 156/244.11 |
| 5,067,885 | 11/1991 | Stevenson et al. | 425/131.1 |
| 5,069,853 | 12/1991 | Miller | 264/176.1 |
| 5,078,366 | 2/1992 | Sicking et al. | 256/13.1 |
| 5,167,891 | 12/1992 | Dijkman et al. | 264/281 |

FOREIGN PATENT DOCUMENTS 62-238728 of 0000 Japan .
63-162216 7/1988 Japan .............. 264/177.17

*Primary Examiner*—Jeffery R. Thurlow
*Attorney, Agent, or Firm*—Standley & Gilcrest

[57] ABSTRACT

The present invention has several aspects: an extrusion apparatus, a method of making a curved extrusion, and a curved extrusion made by the method. In broadest terms, the apparatus of the present invention comprises: (1) an extruding means, typically an extruder, adapted to produce an extrudate having a cross-section; (2) a plurality of guide members arranged so as to form a curvilinear path through which the extrusion is passed, each of the guide members having an aperture having substantially the same shape as the cross-section of the extrusion, whereby the plurality of guide members are adapted to form the extrusion into a curved shape while maintaining the cross-section of the extrusion; and (3) mechanical means adapted to conduct the extrusion through said plurality of guide members, such as an extrusion puller.

9 Claims, 3 Drawing Sheets

APPARATUS AND METHOD OF FORMING CURVED EXTRUDED PRODUCTS

TECHNICAL FIELD

The present invention relates to an apparatus and method for forming curved extruded plastic products, and to the products of said method.

BACKGROUND

There are a wide variety of uses for non-linear plastic products. One field where curved plastic products find use is in the building industry. A variety of plastics are finding increasing use in buildings particularly due to their weatherability characteristics such as water-repellency and color-fastness, and their relative light weight and strength. There is increasing demand for curved plastic building members not only due to their ability to bear and distribute stress, but because they allow a greater degree of architectural freedom in the design of buildings. Curved plastic members allow the builder to create modern designs as well as to recreate the curvature of wood found in classic architectural styles.

One such use for curved plastics is in the field of window and door frames. Arched window or door frames in the past have been created by reshaping a linear extruded plastic piece through the use of elaborate table jig systems. The linear plastic extrudate is softened by heating and laid onto a table jig having a large number of stress clamps. These clamps must be painstakingly aligned to bring the plastic piece into the desired shape. Such table jig systems are expensive and require time-consuming effort by skilled operators to produce a finished product. Each curved plastic piece must be individually produced by the application of heat energy to a linear plastic piece which usually has been extruded through the use of energy during the extrusion process. Accordingly, the present method for producing consistently and accurately shaped curved plastic pieces is both energy and labor intensive, and requires the use of expensive, specialized equipment by skilled craftsman. One of the obstacles to producing many such curved plastic pieces is that, in many instances, the curved plastic pieces must conform to a builder's dimensional specifications and tolerances in order to be compatible with the other building materials with which they will be used. For instance, curved plastic pieces for use in window and door frame pieces generally must have consistent curvature and cross-section or "profile" in order to fit together both with the building itself and the other window and door components.

Accordingly, it is an object of the present invention to be able to produce curved plastic pieces in a relatively fast, continuous process.

It is also an object of the present invention that such curved plastic pieces be so produced while maintaining appropriately accurate curvature and cross-section in the piece.

Yet another object of the present invention to be able to produce such curved plastic pieces in a process which is less labor intensive and requires no specialized jig system or the efforts of skilled operators.

In light of the present disclosure and the practice of the present invention, other advantages and the solutions the other problems my become apparent to one of ordinary skill in the relevant art.

SUMMARY OF THE INVENTION

The present invention has several aspects: an extrusion apparatus, a method of making a curved extrusion, and a curved extrusion made by the method.

In broadest terms, the apparatus of the present invention comprises: (1) an extruding means, typically an extruder, adapted to produce an extrudate having a cross-section; (2) a plurality of guide members arranged so as to form a curvilinear path through which the extrusion is passed, each of the guide members having an aperture having substantially the same shape as the cross-section of the extrusion, whereby the plurality of guide members are adapted to form the extrusion into a curved shape while maintaining the cross-section of the extrusion; and (3) mechanical means adapted to conduct the extrusion through said plurality of guide members, such as an extrusion puller.

The extrusion means used in the present invention may be any extruder, such as those commercially available including, for instance, a 2 ½ inch, 24:1 diameter ratio single screw extruder from McNeil NRM, Inc. of Akron, Ohio; or a 55 inch, conical screw, twin screw extruder from Cincinnati Milacron Company of Cincinnati, Ohio.

The guide members may be made of any material sufficiently dimensionally stable to allow the formation of curvature in the uncureduncooled extrusion material. Typical of such materials is steel which may be machined to have the desired aperture shape in accordance with the profile of the extrusion to be produced.

It is preferred that the guide members have at least one separation seam, passing through the aperture, which would allow them to be reversibly separated into two or more pieces to liberate the extrusion as the extrusion is run out. The guide members can be held together by any appropriate mechanical means, such as by screws or clamps. Such a construction also makes cleaning or other treatment of the aperture surface easier.

The plurality of guide members may also be arrayed and mounted in such a way so as to allow the array to be altered to change the curvilinear path through which the extrusion passes. This may be done by placing the guide members on lockable swivel mount to permit them to be turned through an infinite number of curvature variations. The guide members may also optionally be removed from the array or additional guide members added as the desired curvature dictates.

It is also preferred that the guide members be capable of being moved to various positions within the array to provide as many curvature variations as possible.

The apparatus of the present invention will normally include a cooling zone, such as a water bath, to cool the extrusion, normally as it passes through the guide members. Where the guide members are adjustable to provide various curvatures, it is preferred that the water bath (or similar cooling zone, have an entrance aperture and at least two exit apertures to accommodate the exit of the extrusion as it travels through differing curvilinear paths. These exit apertures may be provided with closure means, such as a sliding door, to allow the apertures to be closed when not in use, while the aperture in the curvilinear path is opened to permit the extrusion to exit the bath or zone.

The present invention also includes a method of producing a curved extrusion generally comprising the steps of: (a) extruding an extrusion having a cross-section; (b) conducting said extrusion through plurality of guide members arranged so as to form a curvilinear path, each of said guide members having an aperture having substantially the same shape as said cross-section, whereby said extrusion is formed into a curved shape while maintaining said cross-section of said extrusion; and (c) allowing said extrusion to cool so as to form a curved extrusion having said cross-section.

The materials which may be extruded in accordance with the present invention include any extrudable material which may be used with known extrusion equipment. These materials include thermoplastic materials, such as polyvinylchlorides (PVC).

It is preferred that the extrusion is passed through a vacuum sizing means prior to be conducted through said plurality of guide members.

The present invention also includes a curved extrusion produced by the method of the present invention.

DETAILED DESCRIPTION OF THE PREFERRED EMBODIMENTS

In accordance with the foregoing summary of the invention, the following presents a detailed description of one embodiment of the present invention which also is presently considered to be the best mode of carrying out the invention.

Figure 1:
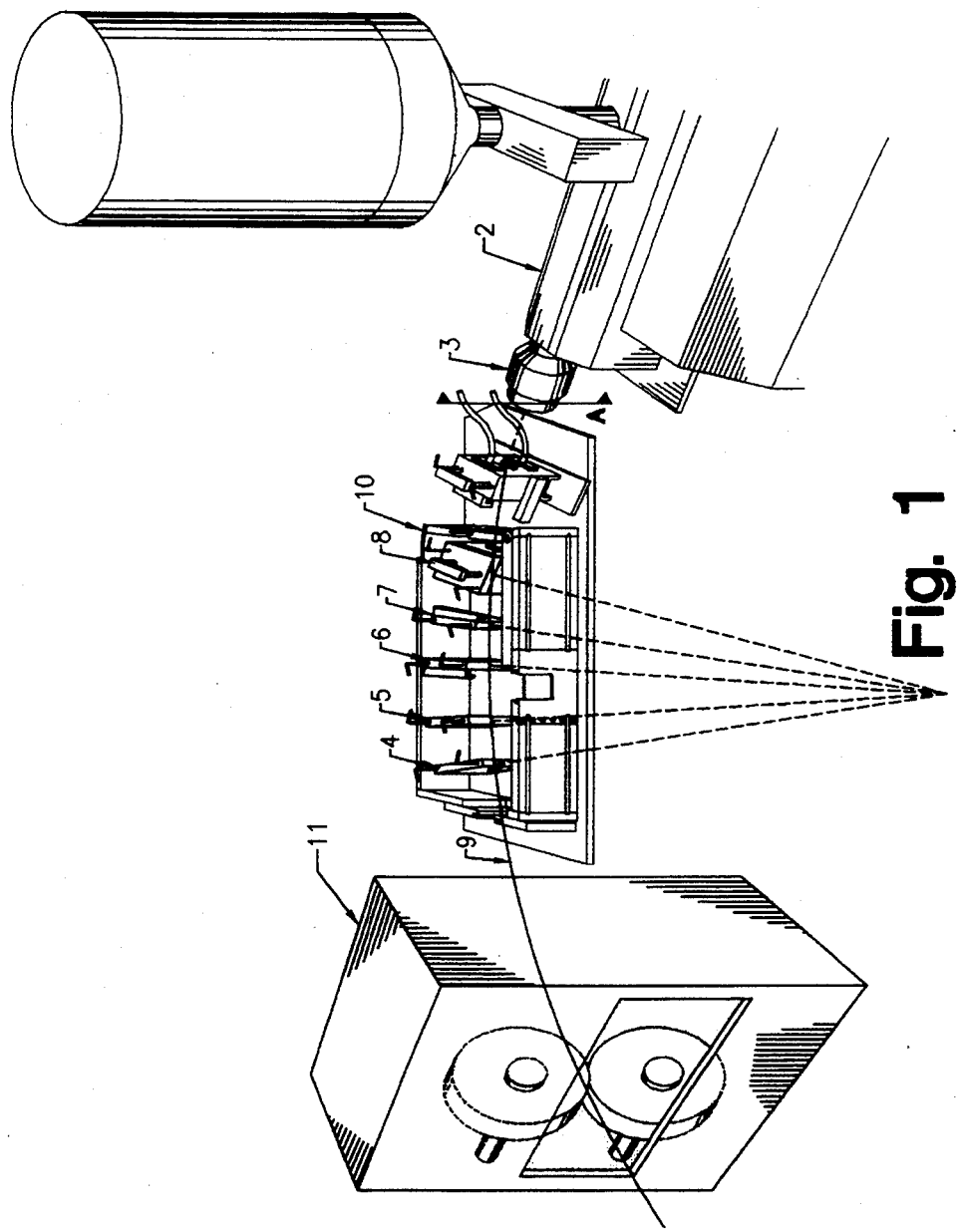
FIG. 1 is a perspective view of an apparatus in accordance with one embodiment of the present invention.

FIG. 1 shows a perspective view of an extrusion apparatus 1 in accordance with one embodiment of the present invention. Extrusion apparatus 1 comprises extruder 2 having extruder head 3 which contains extrusion die (see FIG. 5).

Extrusion apparatus 1 also comprises a plurality of guide members 4–8 which form a curvilinear path 9 (shown with radii of curvature) through which an extrudate traverses after emerging from extruder head 3. Guide members 4–8 are also adapted to maintain the cross-sectional shape of the extrudate by virtue of apertures 4a–8a (see FIG. 2), in each respective guide member 4–8.

Figure 2:
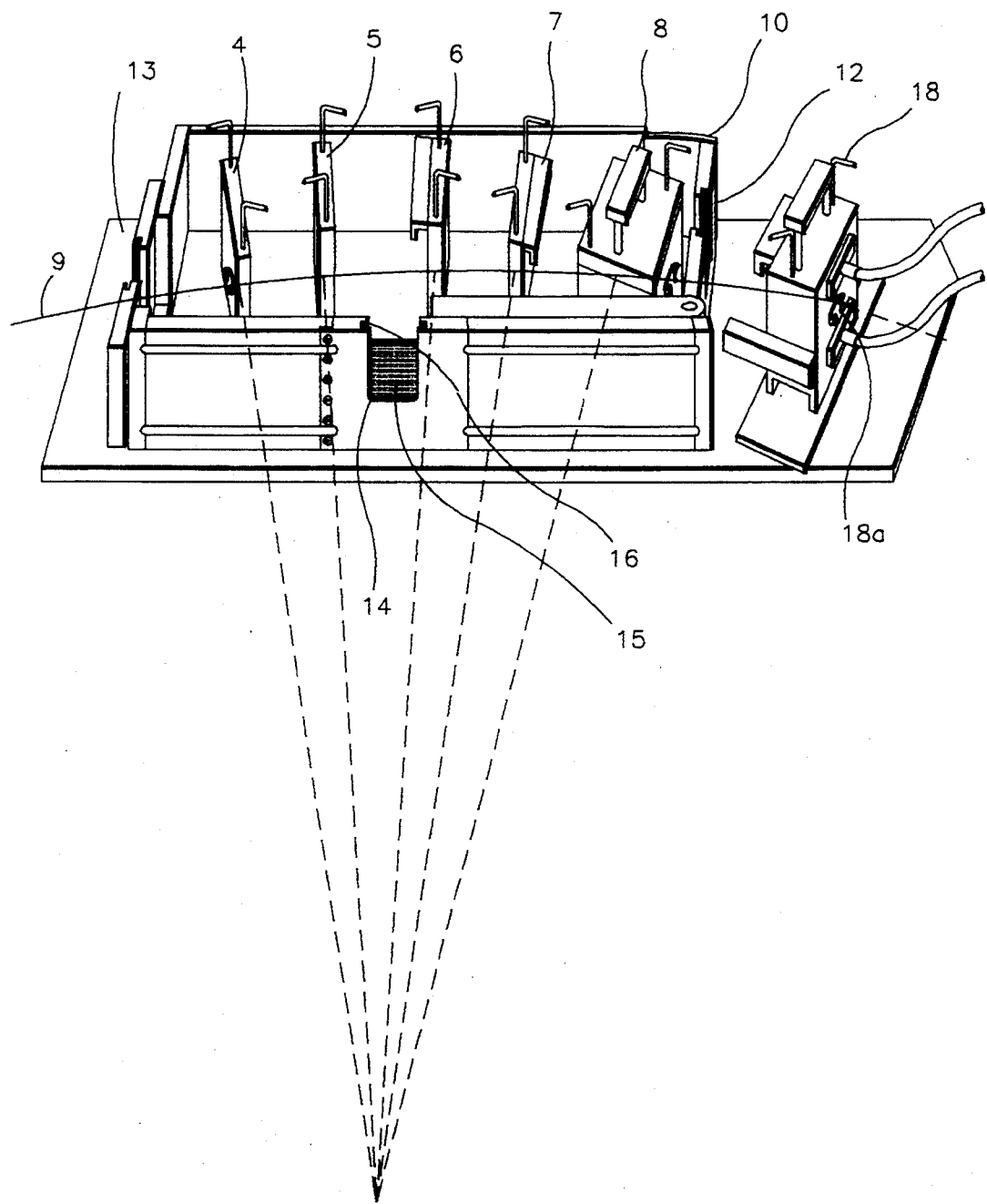
FIG. 2 is a perspective view of a portion of an apparatus in accordance with one embodiment of the present invention, showing the plurality of guide members in a cooling bath.

The guide members are also disposed in water bath which is filled with water to an extent that the extrudate passing there through is cooled by the water. FIG. 2 shows the water bath in more detail.

Extrusion apparatus 1 also includes a puller 11 which is adapted to drive the extrudate through the guide members by a pulling action. It is preferred that an opposed wheel type puller be used to best accommodate a curved extrudate without imparting undue stress to the extrudate which is counter to its natural shaping. An example of such a puller is a pipe puller. Using a straight-line puller $\phi$ could potentially deform the yet uncooled extrudate piece coursing through or emerging from the guide members.

FIG. 2 shows the guide members 4–8 and the cooling bath 10 in more detail. FIG. 2 shows each of the guide members 4–8 having respective apertures 4a–8a which are shaped so as to closely conform to the cross-section of the extrudate emerging from the extruder die (compare the shape of the extruder die in Figure 3. The guide members may also be adapted to be movable into different arrangements so as to be capable of forming a more or a less severely curved curvilinear path.

FIG. 2 also shows cooling bath 1 which has an entrance aperture 12 and exit apertures 13 and 14. The exit apertures are adapted to be opened or closed so as to permit the extrudate to exit the cooling bath at different points depending upon the severity of the curvature imparted to the extrudate. The exit apertures may be closed by small doors such as door 15 fitted into slot 16 which closes aperture 14 while aperture 13 is in use. If the guide members are arranged into a more severely curved path than shown in FIG. 2, exit aperture 13 may be closed (i.e. by placing a door piece like door 15 into slot 17) and aperture 14 opened so as to allow egress of the extrudate from the cooling bath 10.

FIG. 2 also shows that the extrusion apparatus 1 may include vacuum sizer 18 having aperture 18a, which may aid in the maintenance of the cross-sectional shape of the extrudate as the extrudate enters the guide members.

Figure 3:
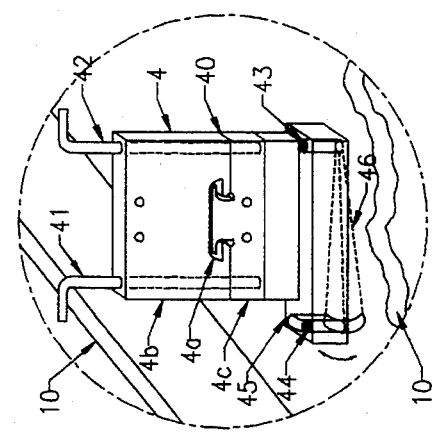
FIG. 3 is an elevational view of an extrusion die used in an apparatus in accordance with one embodiment of the present invention.

FIG. 3 shows an elevational view of a typical extrusion die which may be used in accordance with the present invention. This die is shown to explain the shape of a given extrudate and it should be understood that the invention is not limited to use with an extrudate of any particular cross-section. Extrusion die 30 is fitted into extruder head 3 by screws 31, or in accordance with any other of several known arrangements used in the extrusion art. Extrusion die 30 contains aperture 32 which imparts a similar cross-sectional shape to the extrudate.

Figure 4:
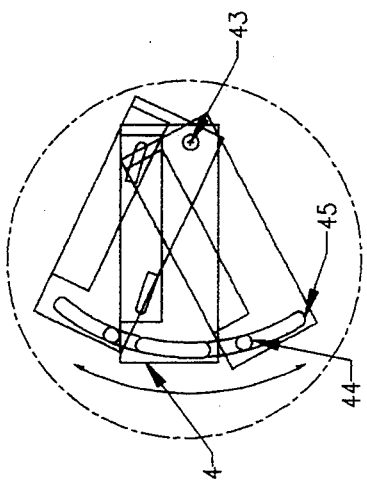
FIG. 4 is an elevational view of one of the guide members used in an apparatus in accordance with one embodiment of the present invention, shown in a closed position.

FIG. 4 shows guide member 4 having aperture 4a. Guide member 4, which is generally exemplary of the other guide members, is split by seam line 40 which divide guide member 4 into two pieces 4b and 4c. By separating the guide member, it is easier to both guide the extrudate into its initial position in the curvilinear path formed by the guide members, and to remove the extrudate from the guide members after a given extrusion run is finished. The guide member halves 4b and 4c may be held together by any appropriate mechanical means, such as by set screws 41 and 42 which connect the two halves.

Guide member 4 is held in position on the bottom of cooling bath 10 by screws 43 and 44; screw 44 being disposed through slot 45. Screw 43 is disposed on the side of the guide member closest the center of curvature, and screw 44 is disposed opposite the center of curvature so that the guide member may be swung through an arc as shown by arc section 46. The other guide members being similarly movably mounted makes possible the formation of more or less severe curvature in the curvilinear path formed by the guide members.

Figure 5:
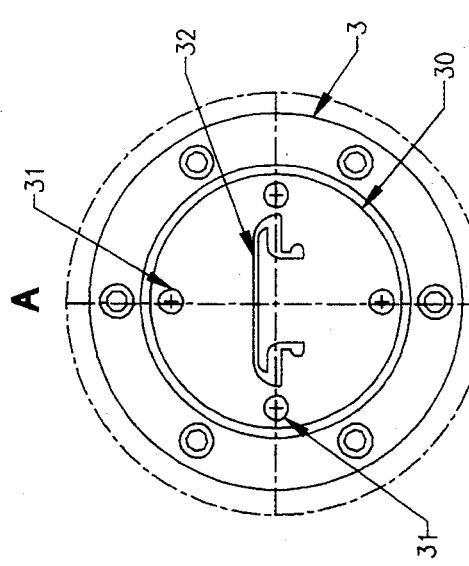
FIG. 5 is an elevational view of one of the guide members used in an apparatus in accordance with one embodiment of the present invention, shown in an open position.

FIG. 5 shows guide member 4 having the same parts as shown in FIG. 4, but in an open configuration.

Figure 6:
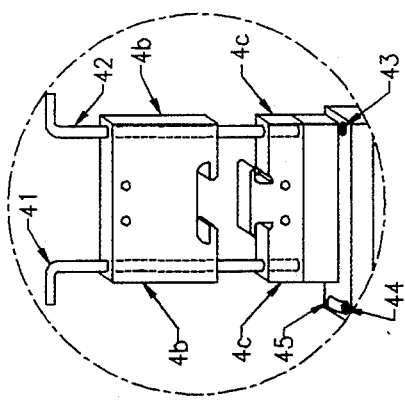
FIG. 6 is a plan view of one of the guide members used in an apparatus in accordance with one embodiment of the present invention.

FIG. 6 shows a plan view of guide member 4 which further shows how guide member 4 may be rotated through an arc about screw 43 by movement of screw 44 in slot 45.

To use the apparatus of the present invention, the 5 guide members, and the optional vacuum sizer when used, are opened and the newly formed extrudate from the extruder head is laid into the opened apertures. The apertures are then closed and the vacuum sizer turned on. The extrusion process begun and the puller activated. Typical extrusion die pressures are in the range greater than 3200 p.s.i. The curvature has been found to be variable from zero curvature to a curvature of as little as a 16 inch radius for typical PVC materials. The curvature may be even further reduced, and may only be limited by the cross-sectional size of the extrudate, the viscosity of the specific material at extrusion temperature, etc.; which may be determined without undue experimentation in light of the present disclosure.

The following presents working examples of actual extrusion runs using the apparatus and method of the present invention through these examples, it will be within the ability of one skilled in the art to make adjustments to process parameters in accordance with the desired cross-sectional shape and thickness, the specific thermoplastic material used, and the desired curvature, to apply the invention to a wide variety of materials, curvatures and cross-sectional profiles.

EXAMPLES

The following working examples are intended to provide further elucidation of the invention in operation, and to provide additional guidance in adapting the invention to the production of curved extrusions of any desired dimension and curvature.

Example 1

| EXTRUDER SET UP INSTRUCTIONS | |
|---|---|
| Machine Type | Single Screw |
| Machine Size | 2½ |
| Screw Cool | AIR TIP |
| Screen Pack | 20 and 40 Mesh |
| Breaker Type | Standard |
| Adapter | 2½" Adapter (from NRM Company) |
| Screw Thrust | 33 Amps |
| Heaters | 2 Round Band Type |
| Screw R.P.M. | 18 |
| Feeder Set | 533 |
| Feeder Condition | Flood |
| Material | 87256/12244 PVC (B.F. Goodrich) |
| EXTRUSION TEMPERATURES | |
| ZONE 1 | 330 |
| ZONE 2 | 330 |
| ZONE 3 | 330 |
| ZONE 4 | 330 |
| ADAPTOR TEMP | 350 |
| DIE TEMP | 350 |

| EXTRUSION OUTPUT | | |
|---|---|---|
| Grams/ft. | MFT (lbs./ft.) | Lbs./hr. |
| 42.0 | 92.58 | 50 |

Full internal calibration cooling was used to maintain the temperature at about 60° F.

All guide members were adjusted inside the water pan to a 36" radius. A 1:1 CAD drawing showing a 36" radius was used to set the guide members which were then locked in place using the mounting brackets. The drawing must be aligned on the centerline of the guides members.

The extrudate was strung through all the guide members which were then fully assembled with dowel pins. The puller may need minor adjustment after stringing extrudate through the guide members.

The water bath was aligned to accommodate the radius of the extrudate, and filled until the extrudate section in the guide members was fully submerged. The vacuum sizer was set at 20 inches of mercury drawn from all sizing vacuum ports. The extruder RPM was adjusted to the appropriate setting.

The water bath temperature was maintained at about 82° F.

Example 2

| EXTRUDER SET UP INSTRUCTIONS | |
|---|---|
| Machine Type | Single Screw |
| Machine Size | 2½" |
| Screw Cool | AIR TIP |
| Screen Pack | 20 and 40 Mesh |
| Breaker Type | Standard |
| Adapter | D-G (2½ Adapter from NRM Company) |
| Screw Thrust | 30 Amps |
| Heaters | 4 Round Band Type |
| Screw R.P.M. | 15 |
| Feeder Set | 245 |
| Feeder Condition | Flood |
| Material | 87256/17298 PVC (B.F. Goodrich) |
| EXTRUSION TEMPERATURES | |
| ZONE 1 | 340 |
| ZONE 2 | 340 |
| ZONE 3 | 340 |
| ZONE 4 | 340 |
| ADAPTOR TEMP | 310 |
| DIE TEMP | 330 |

Full internal calibration cooling was used to maintain the temperature at about 60° F.

All guide members were adjusted inside the water pan to a 36" radius. A 1:1 CAD drawing showing a 22.5" radius was used to set the guide members which were then locked in place using the mounting brackets. The drawing must be aligned on the centerline of the guides members.

The extrudate was strung through all the guide members which were then fully assembled with dowel pins. The puller may need minor adjustment after stringing extrudate through the guide members.

The water bath was aligned to accommodate the radius of the extrudate, and filled until the extrudate section in the guide members was fully submerged. The vacuum sizer was set at 20 inches of mercury drawn from all sizing vacuum ports. The extruder RPM was adjusted to the appropriate setting.

The water bath temperature was maintained at about 82° F.

In light of the foregoing disclosure, it will be within the ability of one skilled in the extrusion arts to make modifications to the present invention, such as through the substitution of equivalent parts and arrangements of parts, or the application of equivalent process steps, without departing from the spirit of the invention.

What is claimed is:

1. An apparatus for forming a curved extrudate, said apparatus comprising:
   a. an extruder having an extrusion die adapted to produce a linear uncured extrudate having a cross-section profile shape;
   b. a plurality of guide members disposed in a cooling bath and arranged so as to from a curvilinear path through which said uncured extrudate is passed, each of said guide members having an aperture adapted to completely enclose said uncured extrudate and having substantially the same shape as said cross-section profile shape, whereby said plurality of guide members are adapted to form said uncured extrudate into a curved shape while maintaining said cross-section profile shape of said extrudate, while said uncured extrudate cools in said cooling bath so as to form a cured extrudate from said uncured extrudate; and c. a puller adapted to conduct said cured extrudate from said plurality of guide members.

2. An apparatus according to claim 1 wherein said plurality of guide members are adjustable so as to be capable of varying the curvature of said curvilinear path.

3. An apparatus according to claim 1 additionally comprising a cooling bath containing said plurality of guide members and defined by side walls, said side walls containing at least three apertures so as to provide an entrance aperture for said uncured extrudate issuing from said extruder, and at least two alternative exit apertures for said cured extrudate after said extrudate has passed through said plurality of guide members.

4. An apparatus according to claim 1 wherein each of said plurality of guide members is separable into at least two pieces along at least one seam line, said at least one seam line passing through said aperture, so as to allow said extrudate to be removed from said guide members.

5. An apparatus according to claim 1 additionally comprising vacuum sizing means disposed between said extruder and said plurality of guide members.

6. An apparatus according to claim 1 wherein said puller comprises an extrusion puller comprising opposed wheels.

7. A method of producing a curved extrudate, said method comprising the steps of:
 a. extruding an uncured extrudate having a cross-section profile shape;
 b. conducting said uncured extrudate through a plurality of guide members disposed in a cooling bath and arranged so as to form a curvilinear path, each of said guide members having an aperture having substantially the same shape as said cross-section profile shape, whereby said uncured extrudate is formed into a curved shape by said guide members while said cross-section profile shape of said extrudate is maintained by said guide members; and
 c. cooling said uncured extrudate so as to form a curved extrudate having said cross-section profile shape.

8. A method according to claim 7 wherein said extrudate is passed through a vacuum sizing means prior to being conducted through said plurality of guide members.

9. An apparatus according to claim 4 wherein each of said plurality of guide members is separable into at least two pieces along at least one seam line, said at least two pieces being removably attachable by action of a hand actuatable attachment.

* * * * *

UNITED STATES PATENT AND TRADEMARK OFFICE
CERTIFICATE OF CORRECTION

PATENT NO. : 5,424,023

DATED : June 13, 1995

INVENTOR(S) : Bobby D. Riley, et al.

It is certified that error appears in the above-identified patent and that said Letters Patent is hereby corrected as shown below:

In column 1, line 61, after the word "invention", please add the word -- is --.

In column 1, line 67, after the word "solutions", please add -- of -- and please delete "my" and replace it with -- may --.

In column 2, line 44, after the word "on", please add -- a --.

In column 2, line 57, after the word "zone", please add -- ) --.

In column 3, line 14, please delete the word "be" and replace it with -- being --.

In column 3, line 61, after the word "in", please add -- a --.

In column 3, line 63, please delete the words "there through" and replace it with -- therethrough".

In column 4, line 4, please delete the symbol "Φ".

In column 4, line 12, after "Figure 3", please add -- ) --.

In column 5, line 22, after the word "invention", please add -- . -- and delete the word "through" and replace it with -- Through --.

In column 5, line 41, in Example 1, beside the heading "Machine Size", please delete "2½" and replace it with -- 2½" --.

UNITED STATES PATENT AND TRADEMARK OFFICE
CERTIFICATE OF CORRECTION

PATENT NO. : 5,424,023

DATED : June 13, 1995

INVENTOR(S) : Bobby D. Riley, et al.

It is certified that error appears in the above-identified patent and that said Letters Patent is hereby corrected as shown below:

In column 8, line 5, please delete the word "extrusion" and replace it with "extrudate".

Signed and Sealed this

Twenty-first Day of November, 1995

Attest:

BRUCE LEHMAN

*Attesting Officer*  *Commissioner of Patents and Trademarks*